Figure 1:
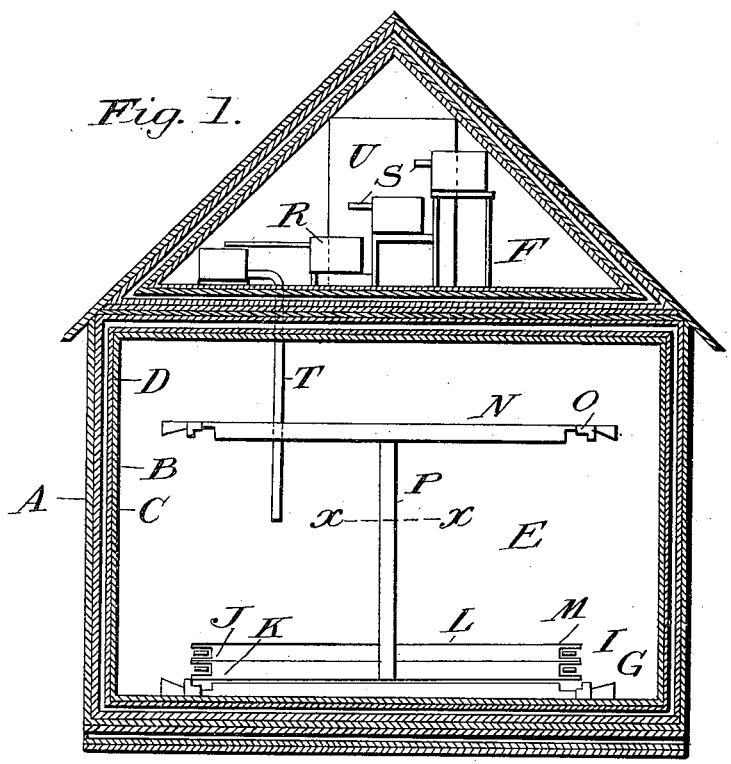

No. 663,426. Patented Dec. 11, 1900.
M. B. EATON.
PROCESS OF FORMING ICE.
(Application filed Dec. 29, 1899.)
(No Model.)

WITNESSES:
Marion Richards
Lottie M. Hawkes

INVENTOR
Matthias B. Eaton
by Verrill & Clifford
Attorneys

UNITED STATES PATENT OFFICE.

MATTHIAS B. EATON, OF BOSTON, MASSACHUSETTS.

PROCESS OF FORMING ICE.

SPECIFICATION forming part of Letters Patent No. 663,426, dated December 11, 1900.

Application filed December 29, 1899. Serial No. 741,883. (No specimens.)

*To all whom it may concern:*

Be it known that I, MATTHIAS B. EATON, a citizen of the United States, residing at Boston, county of Suffolk, Commonwealth of Massachusetts, have invented certain new and useful Improvements in Processes of Forming Ice; and I do hereby declare the following to be a full, clear, and exact description of the invention, such as will enable others skilled in the art to which it appertains to make and use the same.

My invention relates to improvements in the process of treating water prior to its congelation in the freezing-tank and in a new and improved method of freezing the water in such manner that it may be readily removed from the freezing-tank.

It is found in practice when attempt is made to freeze water in a tank by the introduction of water intermittently or continuously thereinto directly from a supply source that the water introduced being above the temperature of freezing tends first to melt to a greater or less degree the ice already frozen in the tank before the newly-introduced water is reduced to the temperature of freezing, thus retarding very materially the process of freezing and injuring the surface of the ice by rendering it porous. I have found after many and varied experiments that I can overcome these difficulties by reducing the temperature of the water to a point at or below the point of freezing in a series of separate cooling-tanks before being conveyed to the ice-freezing tank. In carrying out this process any convenient mechanism may be employed.

By my improved process of cooling and purifying the water before introduction into the freezing-tanks I obtain purer and more perfectly and evenly frozen ice, thereby rendering the ice less injurious and more lasting.

Because of the series of tanks the water has alternate periods of motion and comparative rest, the water delivering from the top of the tanks tending to prevent surface congelation. It also prevents the delivery of any impurities which may be precipitated while in the cooling-tanks, thus producing a much purer ice.

The apparatus shown in the drawings consists of a series of tanks R, placed one above the other and provided with open spouts S, so that the water introduced into the higher one flows through said open spouts, delivering from the surface of the tanks and falling through the air into the next below, and so on until finally it passes from the lower tank through a suitable conveyer T to the freezing-tank, the water thereby having alternate periods of comparative rest and motion. These cooling-tanks may be placed in the upper chamber of the housing, and the degree of cold may be regulated by means of suitable doors U made therein and by cold-air blasts brought into contact with the water, or the tanks may be located outside the housing, if preferred, the principle being the same. The water being in motion may have its temperature reduced to or below the freezing-point without actual crystallization and being thus introduced into the freezing-tanks does not tend to melt the ice already formed therein.

I have illustrated one style of apparatus for practicing my invention in the drawings herewith accompanying, but do not intend thereby to confine myself to this particular form.

Figure 2:
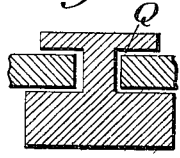
Figure 3:
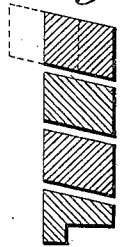
Figure 4:
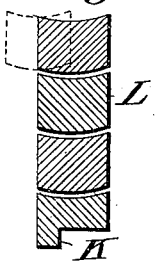
Figure 5:
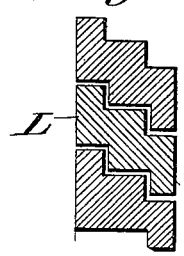
Figure 6:
Figure 7:
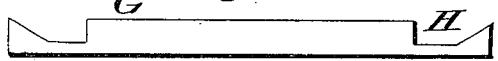

Figure 1 is a central sectional view of my improved housing, ice-freezing tank, and water-supply tanks, the two latter showing in elevation. Fig. 2 is a detail sectional view taken on line $x\,x$ of Fig. 1. Figs. 3, 4, and 5 are detail sectional views of various forms of the individual slats which compose the walls of the ice-tank. Fig. 6 is a vertical sectional view of a portion of the ice-tank constructed of sections similar to the form shown in Fig. 3, except that the recess in the sills is on the outside, and Fig. 7 is a side elevation of sills I, showing inclined cuts H.

The same letters of reference refer to like parts in all the views.

The housing is shown as constructed of the outer wall A, the inner wall B, and a dead-air space C. One or both of the inner sides of said walls may be covered with non-heat-conducting material D, composed of asphaltum, pitch, oil, sulfur, lime, and a suitable binder, as sawdust. This composition may be applied to the walls in any convenient manner. This structure entirely surrounds the housing, including the floors, walls, and roof. The housing is divided into two compartments, one, E, containing the ice-freezing tanks and the other, F, containing the water cooling and purifying tanks.

The ice-freezing tank is designed to be both laterally and vertically adjustable and at the same time to maintain a perfect joint between the several slats. This is especially important in view of the fact that ice in freezing expands both laterally and vertically and the ice adhering to the slats would lift the slats as well as move them laterally during the process of freezing. In accomplishing this purpose I first place upon the floor of the housing the sills G, having downwardly and inwardly inclined cuts H near the ends thereof, and upon these are placed transverse sills I, similar to sills G and having similar cuts, said last-mentioned sills being inverted and the cuts in the transverse sill registering with the cuts in sills G. Said sills may have on their inner edges a recessed groove J, in which corresponding projections K on the lower slats are adapted to fit. After the ice is frozen between the sills to a point at or near the top thereof a set of slats L, having their ends tongued and grooved together, as seen at M in Fig. 1, are placed upon said sills. When ice is frozen therein to a point at or near the top of this frame of slats, another frame is placed on top thereof, and so on until the cake is of the desired thickness, after which there is placed upon the top a rectangular frame composed of timber N and O, having inclined cuts, the same corresponding with the sills and cuts before mentioned. The slats which form the body of the tank may be inclined downwardly toward the center of the tank, as seen in Fig. 3, or curved, as seen in Fig. 4, or with zigzag lines of division, as seen in Fig. 5. It will be seen that as the water freezes between each frame of slats said slats may move either laterally or vertically independently of the position of the frame of slats below, as seen in dotted lines in Figs. 3 and 4, to accommodate the lateral and vertical expansion of the ice during the process of freezing. When the sides or ends of the tank are very long and it would be inconvenient to use single slats for the entire length, standards P may be secured to the sills, and the inner ends of the slats may project into vertical grooves Q therein. The advantages of this construction of the ice-freezing tank are more perfect adjustability thereof and consequent less danger of fracture by the expansion of the ice during the freezing process. It also affords a more perfect joint between the slats.

To facilitate the removal of the ice from the tank, I find it convenient to freeze the ice in sections, placing therebetween strips of paper or other suitable material. I am aware that this is not broadly new; but, so far as I know, only a single strip of paper has been used, which, freezing both to the top and bottom of the ice, practically defeats the object for which it is designed. I overcome this objection by first freezing a layer of ice, then placing on top of this first strip of paper a second strip, and then introducing more water and allowing it to freeze thereon, thus making a complete separation of the two layers of ice, each having a sheet of paper frozen thereto. This structure I have illustrated in Figs. 6, in which V represents the layers of ice, W one of the strips of paper, and X the other.

Having thus described my invention and its use, I claim—

1. The herein-described process of purifying and freezing water by natural cold which consists in causing it first to be alternately at comparative rest in cooling and purifying tanks situated one above the other and in motion through the air between successive tanks delivering from the surface of the tanks, and thence conveying it to a freezing-tank, subjecting it constantly to air at a low temperature.

2. The herein-described process of purifying and freezing water by natural cold which consists in first reducing the water to a low temperature by causing it to be alternately at comparative rest in a series of cooling and purifying tanks located one above the other and delivering from the surface of a higher to the next lower in the series through the air, subjecting the water in said tanks and while passing from one to the other to air at a low temperature and then allowing the water to fall thus cooled from the last of said series of cooling-tanks into a freezing-tank and subjecting it, while in the freezing-tank, to air at a lower temperature than while in the cooling-tanks.

3. The herein-described process of forming ice in large bodies which consists in introducing water into a suitable tank and allowing it to freeze, placing thereon a sheet of paper or other suitable material and allowing it to freeze thereto, then placing on said first strip of paper another similar strip and introducing more water and allowing it to freeze thereon.

In testimony whereof I affix my signature, in presence of two witnesses, this 19th day of December, 1899.

MATTHIAS B. EATON.

Witnesses:
L. H. FREY,
G. F. MORROW.